United States Patent [19]

Pankratz

[11] 4,029,516
[45] June 14, 1977

[54] PROCESS FOR PRODUCING SOLUBLE AMYLOSE

[75] Inventor: Thomas John Pankratz, Newark, Del.

[73] Assignee: E. I. Du Pont de Nemours and Company, Wilmington, Del.

[22] Filed: Apr. 9, 1976

[21] Appl. No.: 675,650

[52] U.S. Cl. .................................. 127/38; 127/32; 127/70; 127/71; 536/102
[51] Int. Cl.² .................. C08B 33/02; C13L 1/08; C13L 1/12
[58] Field of Search .................. 127/32, 70, 71, 38; 260/233.3 R; 536/102

[56] References Cited
UNITED STATES PATENTS

| | | | |
|---|---|---|---|
| 1,773,056 | 8/1930 | Meyer | 127/32 |
| 3,086,890 | 4/1963 | Sarko et al. | 127/71 X |
| 3,188,237 | 6/1965 | Moshy et al. | 127/32 |
| 3,222,220 | 12/1965 | Wurzburg | 127/32 |
| 3,313,464 | 4/1967 | Macarus et al. | 127/71 X |
| 3,326,893 | 6/1967 | Moshy et al. | 127/70 X |
| 3,881,991 | 5/1975 | Kurimoto et al. | 127/32 X |

*Primary Examiner*—Morris O. Wolk
*Assistant Examiner*—Michael S. Marcus

[57] ABSTRACT

A multi-step process for producing soluble amylose involving the dissolution and dissociation of amylose in a first organic solvent, the hydrolyzation of amylose into lower molecular weight components, and the use of a second organic solvent to form a precipitate.

6 Claims, 1 Drawing Figure

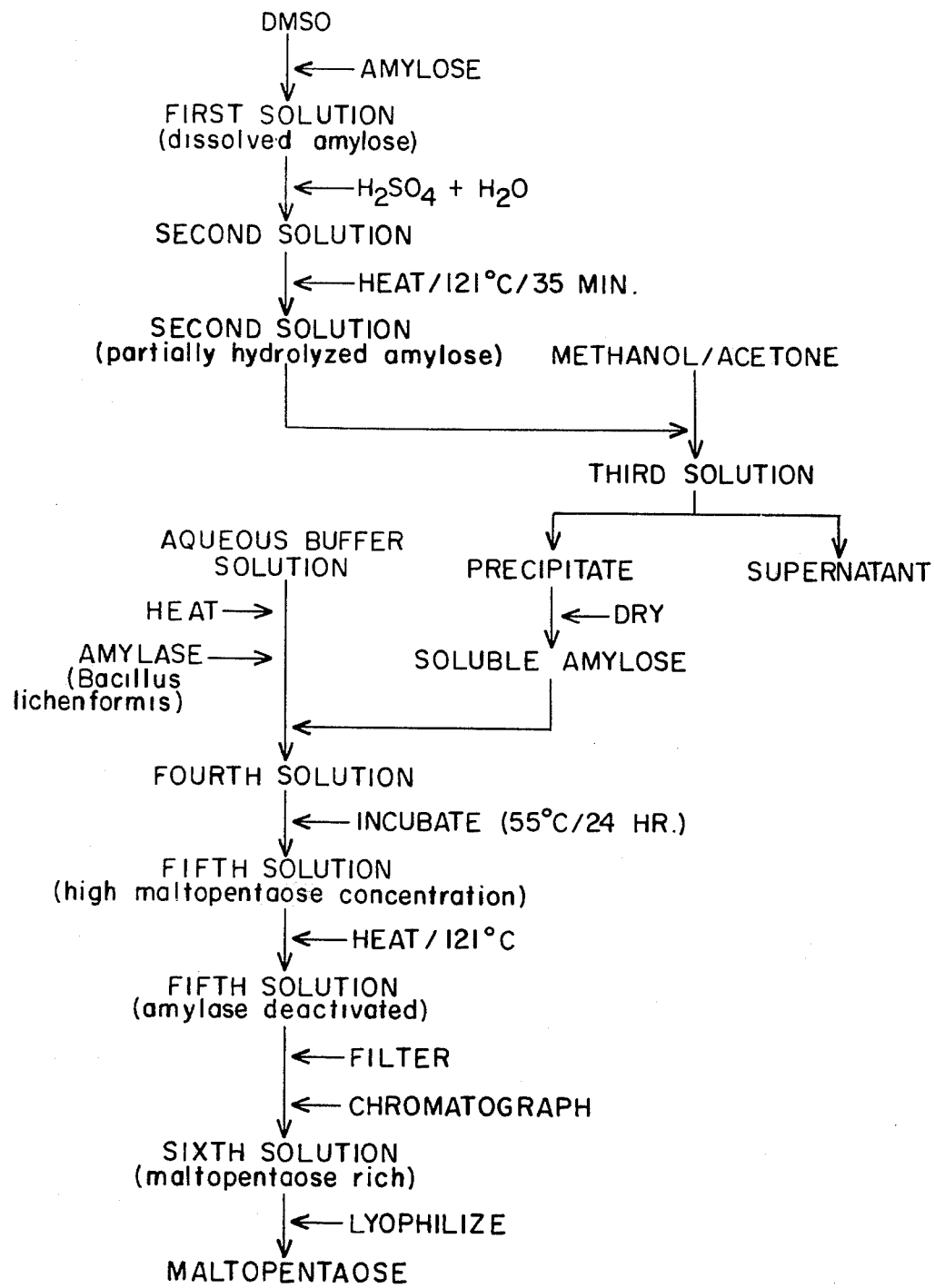

PROCESS FOR PRODUCING SOLUBLE AMYLOSE

BACKGROUND OF THE INVENTION

1. Field of the Invention

The present invention is concerned with a process for producing water soluble amylose from water insoluble high molecular weight amylose.

2. Discussion of the Prior Art

It has recently been discovered that maltopentaose is one of a limited number of polysaccharides which can be used as a substrate in a preferred procedure to measure serum amylase. See, for example, U.S. Pat. No. 3,879,263 which issued to Thomas Adams on Apr. 22, 1975.

Although maltopentaose is one of the hydrolysis products of starch reacted with various amylases, the other products of this reaction (i.e., glucose and the other linear polysaccharides formed by the linked glucose molecules) predominate. Since only a very small percentage of the reaction product is maltopentaose, the hydrolysis of starch by amylase does not lend itself well to a commercial process for producing maltopentaose.

It is known that the enzyme amylase obtained from a particular source, *Bacillus licheniformis*, when reacted with amylose or amylopectin produces a higher percentage of maltopentaose than produced when other sources of amylase are used. See the article by Saito in the Archives of Biochemistry and Biophysics, 155, 290 (1963). However, the yield of maltopentaose from such reactions is still small because of the limited solubility of amylose in the aqueous medium required for the biological hydrolysis.

SUMMARY OF THE INVENTION

A multi-step process for producing soluble amylose has now been found. According to this invention, the process comprises the steps of:

a. dissolving amylose in a first organic solvent capable of dissociating and dissolving the amylose to form a first solution;

b. mixing the first solution with an aqueous acid solution capable of partially hydrolyzing the dissociated amylose, thereby forming a second solution;

c. heating the second solution to partially hydrolyze the dissociated amylose into lower molecular weight components;

d. mixing the second solution containing the partially hydrolyzed amylose with a second organic solvent capable of stripping the first organic solvent from the hydrolyzed amylose to form a third solution, and allowing a precipitate containing partially hydrolyzed amylose to form; and e. collecting, washing and drying the precipitate to form soluble amylose.

In the preferred embodiment, the first organic solvent is dimethyl sulfoxide and the aqueous acidic solution is an aqueous sulfuric acid solution.

BRIEF DESCRIPTION OF THE DRAWINGS

The present invention will be described by reference to the single FIGURE which represents a flow diagram for a specific embodiment of the process.

DETAILED DESCRIPTION OF THE INVENTION

The procedure begins by mixing amylose, a long chain linear or lightly branched glucose polysaccharide, with an organic solution capable of dissolving the amylose. The linear molecules of amylose are normally entwined with one another and, in this form, are highly insoluble in water at a concentration greater than 2 gm per 100 ml solution. The organic solvent used in this process dissociates the amylose by solvating the linear molecules so that they are dissolved to form a solution (hereinafter referred to as the first solution). Any organic solvent, well known to those skilled in the art, which will dissolve amylose can be used in the process of this invention. Dimethyl sulfoxide (DMSO) is an example of a suitable organic solvent.

The first amylose solution is then mixed with an aqueous acid solution capable of partially hydrolyzing the individual amylose molecule into lower molecular weight segments. Many acid well known to those skilled in the art can be used in this second solution. Sulfuric acid is one suitable acid. An aqueous solution is necessary, since water is needed as a reactant in the hydrolysis process. The mixture of the first (dissociated amylose containing) solution with the aqueous acidic solution produces a solution (hereinafter referred to as the second solution), and partial hydrolysis is accomplished by raising the second solution to an elevated temperature for a time sufficient to accomplish the partial hydrolysis. Any elevated temperature will produce some hydrolysis if maintained for a sufficient time, however, to produce sufficient hydrolysis in a reasonable length of time, the second solution should be heated to above about 100° C.

The second (hydrolyzed amylose containing) solution is then mixed with a second organic solvent to form a third solution. The second organic solvent is chosen for its ability to strip the first organic solvent molecules from the partially hydrolyzed amylose, rendering the partially hydrolyzed amylose insoluble in the third solution. The amylose segments which are no longer soluble in the third solution form a precipitate which is a mixture of linear glucose polysaccharides ranging in length from 2 to approximately 75 glucose units. The particular second organic solvent used depends upon what first organic solvent is used, but a number of organic solvents capable of stripping the first organic solvent from the partially hydrolyzed amylose can easily be chosen by one skilled in the art. Suitable second organic solvents which can be used when DMSO is used as the first organic solvent are methanol, acetone, and mixtures thereof.

The precipitate, which will be referred to as soluble amylose, is removed from the third solution, washed with a suitable organic solvent well known to those skilled in the art, and dried to form a solid. The liquid residue is discarded.

Soluble amylose can be used to produce maltopentaose as follows. The soluble amylose prepared above is mixed with amylase obtained from the bacterium *Bacillus licheniformis* in an aqueous solution buffered to optimize amylase activity. Any pH of between about 4 and 10 will suffice. The mixing of these two components, to form a fourth solution, is preferably accomplished at a temperature close to but not exceeding 100° C. The amylase and soluble amylose are mixed at an elevated temperature because the higher molecular weight amylose segments will remain dissolved in the fourth solution longer at elevated temperatures, giving the amylase an opportunity to break down these high molecular weight segments into lower molecular weight fragments. After the amylase has been added, the fourth (amylose/amylase containing) solution is incubated at an elevated temperature for a time sufficient to produce a fifth solution containing a high maltopentaose concentration. This step in the process is a time/temperature/amylase dependent step. At a given temperature and a given amylase concentration, the concentration of maltopentaose in the fifth solution will increase to a maximum in a given time, after which the maltopentaose concentration will begin to decrease in favor of lower chain-length polysaccharides (i.e., maltotetraose, maltotriose, maltose and glucose). At a given temperature and amylase concentration, the time required to produce the maximum concentration of maltopentaose in the fifth solution can be easily determined by sampling and testing the fifth solution. A temperature of between about 50° and 60° C. and a reaction time of about 24 hours is routinely used to produce a maximum maltopentaose concentration.

Once the maximum maltopentaose concentration is obtained, the amylase in the fifth solution must be deactivated. This can be done in a number of ways well known to those skilled in the art. One way is to heat the fifth solution to a temperature above 100° C., preferably 120° C., for a time sufficient to destroy the amylase activity. The (amylase deactivated) fifth solution is then filtered to remove particulate contaminants, and fractionated to collect the maltopentaose. One way to obtain the maltopentaose components of the fifth solution is to use a separation column. The technique of separating various organic fractions from aqueous solutions is well known and will not be discussed here. With little or no experimentation, a maltopentaose-rich solution, hereinafter referred to as the sixth solution, can be obtained from the separation column.

This sixth solution is then dried to produce a maltopentaose-rich solid product. Drying can be accomplished in a number of ways, but one satisfactory way is to lyophilize the product. The sixth solution can be made to contain as much as 98% of maltopentaose with small percentages of maltotetraose and maltohexaose as contaminants.

EXAMPLE

Preparation of Soluble Amylose

A 10 liter graduated cylinder with a contained stirring bar is placed on a Cole-Parmer magnetic stirrer. 4.73 liters of DMSO are added to the graduated cylinder, and the stirring bar is rotated at moderate speed. One kilogram of amylose is added to the graduated container so that the amylose mixes evenly in the DMSO and no clumps are formed. The stirring bar is adjusted to maximum speed and this first solution is allowed to stir overnight or until the amylose goes completely into solution. Any concentration of amylose in the DMSO will work, but, in the preferred embodiment, this first solution contains between about 15 and about 20 w/v of amylose in the DMSO.

Sixty milliliters of 10% sulfuric acid ($v/v$) are then added to the graduated cylinder and mixed thoroughly with the contents of the graduated cylinder to form a second solution. The graduated cylinder with its contents is then placed in an autoclave and heated for 55 minutes at 121° C. to partially hydrolyze the amylose in the second solution. Again, any concentration of acid in the solution will produce some hydrolyzation, but, in the preferred embodiment, the second solution contains between about 0.05 and about 0.20% of $H_2SO_4$.

Fifteen liters of methanol and 7.5 liters of acetone are brought to a temperature of 4° C. and then mixed in a 38 liter container. After the graduated cylinder with its contents had cooled to 100° C., the contents of the graduated cylinder are poured into the cold methanolacetone solution and stirred. The resulting solution, referred to as the third solution, is then left for a time sufficient to allow a precipitate to form. By allowing the mixture to stand overnight, most of the precipitated soluble amylose settles from the third solution. The liquid residue is decanted off and discarded, and the precipitate is filtered using a Buchner Funnel and coarse filter paper. The precipitate is washed in 3.79 liters of methanol and then removed from the methanol by filtration, again using a Buchner funnel and filter flask. In both collection stages, care must be taken not to allow moisture in the air to dissolve the amylose.

The precipitate is placed in a lyophilization tray and dried overnight in a Hull lyophilizer to provide dry soluble amylose.

Preparation of Maltopentaose From Soluble Amylose

An aqueous buffer solution is prepared using 5 liters of Trisma buffer to which is added 12.1 grams of Trisma base and sufficient acetic acid to bring the pH of the buffer solution to $8.0 \mp 0.2$. This buffer solution is placed in a 20 liter stainless steel container and autoclaved for 15 minutes at 121° C.

When the buffer is removed from the autoclave, and while the temperature is greater than 90° C., 0.5 milliliters of amylase obtained from *Bacillus licheniformis* is added to the buffer solution and stirred with a magnetic stirring bar. Such amylase is sold under the trade name Thermamyl 60 by Novo Chemical Company.

After the amylase is dispensed in the buffer solution, 1000 grams of soluble amylose prepared according to the procedure set forth above is added to the buffer so that no large aggregates of soluble amylose are formed. This fourth solution is autoclaved for 15 minutes at 121° C. The solution is then removed from the autoclave while it is still hotter than 90° C., and 0.5 milliliters of the same amylase is again added to the buffer solution. When the temperature of the buffer solution drops to 85° C., an additional 1.0 milliliters of amylase is added, and 1.0 additional milliliters of amylase are added at every 5° decrease in temperature down to and including 55° C., the total amount of amylase added being 8.0 milliliters.

This fourth solution is incubated overnight at 50° to 55° C. using a heated stirring plate. A fifth solution containing a high maltopentaose concentration is formed.

After about 24 hours, a 1 milliliter sample of this fifth solution is removed and the carbohydrate composition in the sample is determined by standard chromatographic techniques. If, on the basis of this analysis, it is determined that the maltopentaose fraction of the total carbohydrate is greater than about 25%, then, the entire solution is placed in an autoclave for 15 minutes at 121° C. to deactivate the amylase enzyme. If the maltopentaose fraction of the carbohydrate in the fifth solution is below about 25%, then additional amylase is added to the solution and the incubation continues until the proper maltopentaose content is achieved.

Once the amylase activity in the solution has been destroyed by autoclaving, the solution is cooled to about 50° C. and all particulate matter is removed from the solution by filtration or centrifugation. The supernate is decanted, and the solid impurities are discarded.

The supernate is then separated using a separation column filled with −400 mesh P2 gel (obtained from Bio-Rad). Using conventional techniques, fractions eluting from the column containing primarily maltopentaose are collected. These fractions, referred to as a sixth (maltopentaose-rich) solution when pooled, contain about 95 to 98% of maltopentaose, with small concentrations of maltotetraose and maltohexaose. The pooled fractions are then lyophilized by conventional techniques to produce a solid maltopentaose-rich product.

The above disclosure has been made to describe the invention to those skilled in the art and is not intended to limit the scope of that invention as defined in the appended claims. Many modifications to the above well within the skill of the art are intended to be incorporated by these claims.

What is claimed is:

1. A process for producing water-soluble amylose comprising the steps of:
   a. dissolving amylose in a first organic solvent capable of dissociating and dissolving said amylose to form a first solution;
   b. mixing said first solution with an aqueous acid solution capable of partially hydrolyzing said dissociated amylose to form a second solution;
   c. heating said second solution to partially hydrolyze said dissociated amylose into lower molecular weight segments;
   d. mixing said second solution containing said partially hydrolyzed amylose with a second organic solvent capable of stripping the first organic solvent from the hydrolyzed amylose to form a third solution, and allowing a precipitate to form in said third solution; and
   e. collecting, washing and drying said precipitate to form water-soluble amylose.

2. The process of claim 1 wherein said first organic solvent is dimethyl sulfoxide.

3. The process of claim 1 wherein said aqueous acid solution is an aqueous solution containing sulfuric acid.

4. The process of claim 1 wherein the step of heating said second solution is accomplished by heating said second solution to a temperature of above 100° C. for at least 30 minutes.

5. The process of claim 1 wherein said second organic solvent contains organic solvents selected from the group consisting of acetone, methanol and mixtures thereof.

6. A process for producing water-soluble amylose comprising the steps of:
   a. dissolving amylose in dimethyl sulfoxide to form a first solution;
   b. mixing said first solution with an aqueous solution of sulfuric acid to dissociate said amylose and form a second solution;
   c. heating said second solution to hydrolyze said dissociated amylose into lower molecular weight segments;
   d. mixing said second solution with a second organic solvent containing materials selected from the group consisting of acetone, methanol and mixtures thereof to form a third solution and allowing a precipitate to form in said third solution; and
   e. collecting, washing and drying said precipitate to form soluble amylose.

* * * * *